United States Patent
Kaneko

(10) Patent No.: US 7,718,083 B2
(45) Date of Patent: May 18, 2010

(54) REFRIGERATOR OIL COMPOSITION

(75) Inventor: Masato Kaneko, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 366 days.

(21) Appl. No.: 11/575,172

(22) PCT Filed: Sep. 14, 2004

(86) PCT No.: PCT/JP2004/013367

§ 371 (c)(1),
(2), (4) Date: Mar. 13, 2007

(87) PCT Pub. No.: WO2006/030490

PCT Pub. Date: Mar. 23, 2006

(65) Prior Publication Data

US 2007/0213239 A1    Sep. 13, 2007

(51) Int. Cl.
*C09K 5/04* (2006.01)
(52) U.S. Cl. .......................................... 252/68
(58) Field of Classification Search .................... 252/67, 252/68
See application file for complete search history.

(56) References Cited

U.S. PATENT DOCUMENTS 5,547,593 A * 8/1996 Sanechika et al. ........... 508/207

2004/0224860 A1 * 11/2004 Baba et al. .................. 508/545

FOREIGN PATENT DOCUMENTS

| JP | 10 168475   | 6/1998  |
| JP | 2001 11480  | 1/2001  |
| JP | 2001 49282  | 2/2001  |
| JP | 2001 181661 | 7/2001  |
| JP | 2001 226690 | 8/2001  |
| JP | 2003 226887 | 8/2003  |
| JP | 2004 067836 | 3/2004  |
| WO | 00 63326    | 10/2000 |

* cited by examiner

*Primary Examiner*—John R Hardee
(74) *Attorney, Agent, or Firm*—Oblon, Spivak, McClelland, Maier & Neustadt, L.L.P.

(57) ABSTRACT

The present invention provides a refrigerator oil composition including: a base oil (A) composed of at least one selected from a polyalkylene glycol, a polyol ester, a poly-α-olefin, an alkylbenzene, and an mineral oil; an organic sulfur compound (B) having a sulfur content of 35% by mass or less; and a refrigerant (C) composed of at least one selected from carbon dioxide gas, a hydrocarbon, and ammonia, in which the refrigerator oil composition has a total sulfur content of 0.01 to 0.1% by mass with respect to a total amount of the components (A) and (B). The refrigerator oil composition is novel, and is free from an environmental problem such as the ozone layer destruction or the global warming, can retain its lubrication property for a long period of time, and does not cause the clogging of a capillary in a refrigeration cycle.

10 Claims, 1 Drawing Sheet

REFRIGERATOR OIL COMPOSITION

TECHNICAL FIELD

The present invention relates to a novel refrigerator oil composition, and more particularly, to a refrigerator oil composition provided with excellent lubrication property using a natural refrigerant.

BACKGROUND ART

In general, the compression-refrigerating cycle of a refrigerator, such as a compression-type refrigerator composed of a compressor, a condenser, an expansion valve, and an evaporator, is constructed to allow a mixture of a refrigerant and a lubricating oil to circulate in this closed system. In such a compression-type refrigerator, conventionally, chlorofluorocarbon such as dichlorodifluoromethane (R-12) or chlorodifluoromethane (R-22) has been used as a refrigerant. For using in combination with chlorofluorocarbon, various kinds of lubricating oils have been produced and employed. However, there is a concern that the chlorofluorocarbon compounds, which have been conventionally used as refrigerants, may cause environmental pollution problems, such as ozone layer destruction, when they are discharged into the atmosphere. For this reason, hydrofluorocarbon, fluorocarbon, or the like, as typified by 1,1,1,2-tetrafluoroethane (R-134a), has been used as a new refrigerant. Such the hydrofluorocarbon or the like may not destroy the ozone layer but its prolonged life in the atmosphere may affect on global warming. In recent years, therefore, natural refrigerants without such the problems are considered to be used.

On the other hand, in a refrigerator oil composition, a phosphorous additive, typically tricresyl phosphate (TCP), has been used as an extreme-pressure agent. However, such a phosphorous extreme-pressure agent had a problem in that it could be denatured and become sludge by thermal decomposition or hydrolysis, or by a tribochemical reaction or the like on a frictional surface. In addition, by denaturing and sludging, the phosphorous additive would be exhausted so that it could not retain its lubrication property for a long period of time, thereby resulting in seizure or wear.

Among the conventional lubricating oil compositions for refrigerators using flon-based refrigerants, a sulfur-containing lubricating oil added with an organic sulfur compound has been proposed (Patent Document 1). The sulfur-containing lubricating oil proposed is excellent in thermal resistance and wear resistance with small variations in viscosity against thermal changes, as well as excellent in flon solubility. According to Patent Document 1, in the flon-based lubricating oil composition for a refrigerator, the content of an organic sulfur compound is important. For example, when mineral oil is used as a base oil, the organic sulfur compound used may be naturally found in mineral oil. However, lubricating-oil compositions for a refrigerator using natural refrigerants have not been provided with sufficient wear resistance and extreme-pressure property only by controlling their sulfur contents.

Patent Document 1: Japanese Patent Application Laid-Open No. 58-103594

DISCLOSURE OF THE INVENTION

The present invention has been made to solve such the problems and intends to provide a lubricating oil composition for a refrigerator using a natural refrigerant, which is capable of retaining its lubrication property for a long period of time without clogging a capillary in a refrigeration cycle.

As a result of intensive studies for developing a lubricating oil composition for a refrigerator having the above-mentioned characteristics, the inventors of the present invention have found that, when a natural refrigerant is used in a refrigerator oil containing a specific organic sulfur compound in a specific base oil, its lubrication property can be retained for a long period of time and a capillary in a refrigeration cycle can be prevented from clogging. The present invention has completed on the basis of such the finding.

That is, according to the present invention, there is provided a refrigerator oil composition including: a base oil (A) composed of at least one selected from a polyalkylene glycol, a polyol ester, a poly-α-olefin, an alkyl benzene, and a mineral oil; an organic sulfur compound (B) having a sulfur content of 35% by mass or less; and a refrigerant (C) composed of at least one selected from carbon dioxide gas, a hydrocarbon, and ammonia, in which a total sulfur content is 0.01 to 0.1% by mass with respect to a total amount of the components (A) and (B).

DESCRIPTION OF REFERENCE NUMERALS

Figure 1:
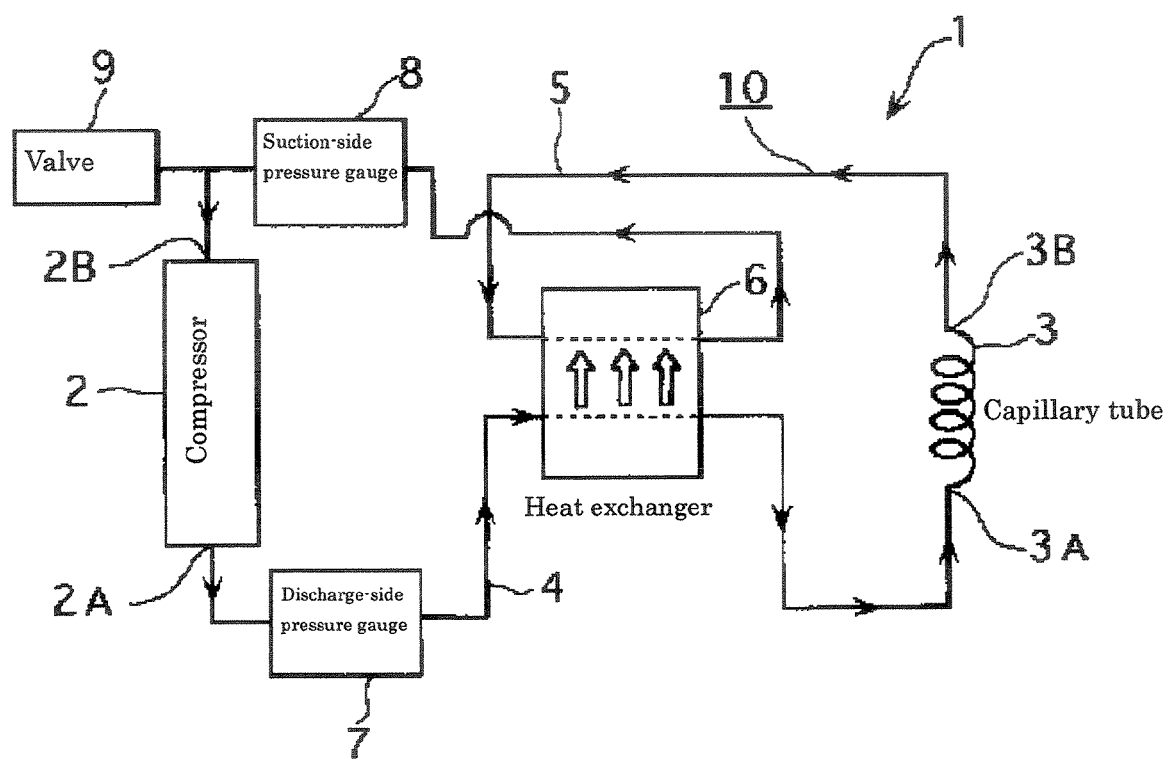
FIG. 1 is a diagram illustrating a capillary-clogging testing device.

1 CAPILLARY-CLOGGING TESTING DEVICE
2 COMPRESSOR
2A COMPRESSOR INLET ORIFICE
2B COMPRESSOR OUTLET ORIFICE
3 CAPILLARY TUBE
3A CAPILLARY INLET ORIFICE
3B CAPILLARY OUTLET ORIFICE
4 HIGH-TEMPERATURE SIDE CHANNEL
5 LOW-TEMPERATURE SIDE CHANNEL
6 HEAT EXCHANGER
7 DISCHARGE-SIDE PRESSURE GAUGE
8 SUCTION-SIDE PRESSURE GAUGE
9 VALVE FOR CONNECTING VACUUM PUMP
10 SIMULATED CIRCULATION SYSTEM

BEST MODE FOR CARRYING OUT THE INVENTION

A lubricating oil composition of the present invention uses as a base oil (A) at least one selected from a polyalkylene glycol, a polyol ester, a poly-α-olefin, an alkyl benzene, and a mineral oil.

A preferable polyalkylene glycol is represented by the following general formula (I):

$$R^1-[(OR^2)_m-OR^3]_n \qquad (I)$$

wherein, $R^1$ represents a hydrogen atom, an alkyl group or an acyl group having 1 to 10 carbon atoms, or an aliphatic hydrocarbon group having 2 to 6 binding sites; $R^2$ represents an alkylene group having 2 to 4 carbon atoms and the polyalkylene glycol may be either a homopolymer or a copolymer; $R^3$ represents a hydrogen atom, or an alkyl group or an acyl group having 1 to 10 carbon atoms; n represents an integer of 1 to 6; and m represents an integer satisfying an average of 6 to 80 in m×n.

The alkyl group may be any one of a linear-chain, a branched-chain, or a ring. Specific examples of the alkyl group include a methyl group, an ethyl group, an n-propyl group, an isopropyl group, various butyl groups, various pentyl groups, various hexyl groups, a cyclopentyl group, and a cyclohexyl group. The alkyl group having 10 or less carbon atoms is preferable because the alkyl group having 10 or less carbon atoms provides sufficient compatibility with a refrigerant.

Further, an alkyl moiety of an acyl group may be any one of a linear-chain, a branched-chain, or a ring. Specific examples of the alkyl moiety of the acyl group include a methyl group, an ethyl group, an n-propyl group, an isopropyl group, various butyl groups, various pentyl groups, various hexyl groups, a cyclopentyl group, and a cyclohexyl group. The acyl group having 10 or less carbon atoms is preferable like the alkyl group because the acyl group having 10 or less carbon atoms provides sufficient compatibility with a refrigerant.

The above-mentioned $R^1$ and $R^3$ may be identical with or different from each other. In the present invention, among polyalkylene glycols represented by the above-mentioned formula (I), it is preferable that either $R^1$ or $R^3$ represents a hydrogen atom and the other represents an alkyl group and that the alkyl group is an alkyl group having 1 to 3 carbon atoms, particularly a methyl group. In addition, it is preferable that each of $R^1$ and $R^3$ represents an alkyl group having 1 to 3 carbon atoms. It is particularly preferable that each of $R^1$ and $R^3$ represents a methyl group. A mixture of two or more kinds of the polyalkylene glycols may be used as the base oil of the present invention.

Examples of the polyol esters include carboxylate esters of polyvalent hydroxy compounds containing at least two hydroxyl groups, preferably those represented by the following general formula (II):

$$R^4[OCOR^5]_f \quad (II)$$

wherein, $R^4$ represents a hydrocarbon group; $R^5$ represents a hydrogen atom or a hydrocarbon group having 1 to 22 carbon atoms; f represents an integer of 2 to 6; and a plurality of $[OCOR^5]$ may be identical with or different from each other.

In the above-mentioned general formula (II), the hydrocarbon group represented by $R^4$ may be of a linear- or branched-chain and preferably an alkyl group having 2 to 10 carbon atoms. $R^5$ is a hydrogen atom or a hydrocarbon group having 1 to 22 carbon atoms, preferably an alkyl group having 2 to 16 carbon atoms. The polyol ester represented by the above-mentioned general formula can be obtained by allowing a polyvalent alcohol represented by the following general formula (III):

$$R^4(OH)_f \quad (III)$$

(wherein $R^4$ and f are identical with those described above) to react with a carboxylic acid represented by the following general formula (IV):

$$R^5COOH \quad (IV)$$

(wherein $R^5$ is identical with one described above) or a reactive derivative such as an ester or acid halide thereof.

Each of various kinds of compounds can be used as the polyvalent alcohol represented by the above-mentioned general formula (III). Examples of the polyvalent alcohol include ethylene glycol, propylene glycol, butylene glycol, neopentyl glycol, trimethylolethane, trimethylolpropane, glycerin, pentaerythritol, dipentaerythritol, and sorbitol. On the other hand, examples of the carboxylic acid represented by the above-mentioned formula (IV) include, but not particularly limited to, propionic acid, butyric acid, pivalic acid, valeric acid, caproic acid, heptanoic acid, 3-methylhexanoic acid, 2-ethylhexanoic acid, caprylic acid, pelargonic acid, decanoic acid, lauric acid, myristic acid, and palmitic acid. A mixture of two or more kinds of the polyol esters may be used as the base oil of the present invention.

A poly-α-olefin is an oligomer of α-olefin containing about 3 to 12 carbon atoms. The molecular weight thereof is preferably 200 to 5,000, or more preferably 300 to 2,000. A mixture of two or more kinds of the poly-α-olefins may be used as the base oil of the present invention.

Alkylbenzene is obtained by alkylating an aromatic compound such as benzene, toluene, xylene, ethylbenzene, methylethylbenzene, diethylbenzene, or a mixture thereof with an alkylating agent such as a lower monoolefin such as ethylene, propylene, butene, or isobutene, or a branched chain olefin having 6 to 40-carbon atoms, which is obtained by polymerization of propylene, or a branched chain olefin having 6 to 40 carbon atoms, which is obtained by thermal decomposition of wax, heavy oil, petroleum fraction, polyethylene, polypropylene, or the like. A benzene portion of the alkylbenzene has 1 to 3 alkyl groups and the base oil of the present invention particularly preferably contains many alkyl benzenes each having two alkyl groups. Note that a mixture of two or more kinds of the alkylbenzenes may be used as the base oil of the present invention.

Examples of the mineral oil used as the base oil of the present invention include, but not particularly limited to, paraffinic mineral oil and naphthenic mineral oil. Among them, one having a sulfur content of 200 ppm by mass or less is preferable. It is preferable to purify the mineral oil so that the sulfur content thereof may be 200 ppm by mass or less depending on the sulfur content of crude petroleum used as a raw material. A mixture of two or more kinds of the mineral oil may be used as the base oil of the present invention.

As described above, the base oil (A) used in the present invention is preferably any of those described above. Among them, polyalkylene glycols, polyol esters, poly-α-olefins, and alkyl benzenes are particularly preferable in terms of stability and evaporation loss. In addition, each of them may be independently used or two or more of them may be used in combination.

The base oil (A) used in the present invention has a kinematic viscosity of preferably 3 to 1,000 mm$^2$/s at 40° C. If it is 3 mm$^2$/s or more, the bases oil can be provided with sufficient lubrication property. If it is 1,000 mm$^2$/S or less, the base oil can be provided with high energy efficiency without being provided with an excessive load. From the viewpoints as described above, the kinematic viscosity of the base oil is preferably in the range of 5 to 500 mm$^2$/s, more preferably in the range of 5 to 150 mm$^2$/s.

Next, the present invention is characterized by containing an organic sulfur compound having a sulfur content of 35% by mass or less as a component (B) If the content of sulfur exceeds 35% by mass, deterioration and sludging may occur. To be specific, polysulfide which contains three or more sulfur atoms in a molecule may lead to such the case. In addition, it is preferable that the content of sulfur exceeds 5% by mass because of attaining a decrease in an addition amount of the component (B).

Examples of the organic sulfur compound (B) preferably used in the present invention include aliphatic sulfur compounds, heterocyclic sulfur compounds, and aromatic sulfur compounds.

The aliphatic sulfur compound preferably has 12 or more carbon atoms, more preferably 14 or more carbon atoms, or particularly preferably 18 or more carbon atoms. Specific examples of the aliphatic sulfur compound include dioctyl sulfide, didodecyl sulfide, and ditetradecyl sulfide.

The heterocyclic sulfur compound preferably has 8 or more carbon atoms, more preferably 10 or more carbon atoms, or particularly preferably 12 or more carbon atoms. Specific examples of the heterocyclic sulfur compound include benzothiophene, dibenzothiophene, phenothiazine, benzothiapyran, thiapyran, thianthrene, dibenzothiapyran, diphenylene disulfide, and alkyl derivatives thereof.

The aromatic sulfur compound preferably has 12 or more carbon atoms or more preferably 16 or more carbon atoms. Specific examples of the aromatic sulfur compound include 4,4'-thiobis(3-methyl-6-t-butylphenol), diphenyl sulfide, dioctyldiphenyl sulfide, and dialkyldiphenylene sulfide.

Furthermore, an aliphatic sulfur compound having 8 or more carbon atoms, a heterocyclic sulfur compound, and an organic sulfur compound other than an aromatic sulfur compound may be used. For examples, such the compounds include organic sulfur compounds having 8 or more, preferably 10 or more carbon atoms and one or more sulfur (S) atoms in a molecule. Specific examples thereof include sulfolane, diphenyl sulfoxide, diphenyl sulfone, thiazole, thiazole derivatives, thiaadamantane, 2-thienyl carbinol, and thiopheneacetic acid.

Among the above-mentioned organic sulfur compounds, diphenylene disulfide, phenothiazine, and dialkyl diphenylene sulfide are preferably used.

The refrigerator oil composition of the present invention has an essential sulfur content of 0.01 to 0.1% by mass on the basis of a total amount of components (A) and (B). If the sulfur content is 0.01% by mass or more, a sufficient lubrication property can be attained. If it is 0.1% by mass or less, the generation of sludge due to denaturation or the like can be sufficiently prevented.

From the viewpoints as described above, the sulfur content is preferably in the range of 0.02 to 0.05% by mass, more preferably in the range of 0.025 to 0.035% by mass.

Furthermore, any of additives commonly used in refrigerator oil compositions can be added to the lubricating oil composition of the present invention. In particular, the additives preferably include antioxidants, acid scavengers, and defoaming agents.

Examples of the antioxidants which can be used include, but not particularly limited to, phenol-based antioxidants and amine-based antioxidants. The acid scavenger is formulated in a refrigerator oil composition to prevent hydrolysis, and examples thereof include phenyl glycidyl ethers, alkyl glycidyl ethers, alkylene glycol glycidyl ethers, cyclohexene oxides, α-olefin oxides, and epoxy compounds such as epoxidized soybean oil. Among them, phenyl glycidyl ethers, alkyl glycidyl ethers, alkylene glycol glycidyl ethers, cyclohexene oxides, and α-olefin oxides are preferable in terms of compatibility. Examples of the defoaming agents include silicone oil and fluorinated silicone oil.

In addition, any of other additives including copper-inactivators, such as benzotriazol or derivatives thereof, may be added as far as it does not affect the purpose of the present invention. Those additives may be added generally in the amount of 0.005 to 5% by mass, respectively.

The refrigerant used in the lubricating oil composition of the present invention is composed of at least one selected from carbon dioxide gas, a hydrocarbon, and ammonia. Here, the term "hydrocarbon" refers to hydrocarbons typically used as a refrigerant, such as propane, butane, and a mixture thereof.

The refrigerator oil composition may contain any of those refrigerants in a content of 10 to 99% by mass in general. If it is 10% by mass or more, it exerts its sufficient refrigeration ability. If it is 99% by mass or less, the lubricating oil is in a sufficient amount, so there is no problem of seizure or wear. Therefore, from the viewpoints described above, the range of 30 to 95% by mass is more preferable.

The refrigerator oil composition of the present invention can be used in various applications, such as air conditioners, refrigerators, gas-heat pumps (GHPs), automatic vending machines, showcase refrigerators, car air conditioners, water heaters, and floor heating appliances.

EXAMPLES

Hereinafter, the present invention will be described in further detail with reference to examples. However, the present invention is not limited to these examples at all.

(Evaluation Method)

1. Sealed Tube Test (Thermal Stability)

A refrigerator oil composition prepared by each of methods described in examples and comparative examples was placed in a glass tube of 10 ml in internal volume, followed by the addition of copper, aluminum, and iron metal catalysts. The glass tube was closed and then left standing at 175° C. for 30 days, followed by evaluating the appearance of the refrigerator oil composition, the appearance of copper, and the presence or absence of sludge.

2 Closed Falex Test (Lubrication Property)

A closed Falex friction testing machine was used to determine wear loss (mg) in accordance with ASTM D2670. Here, the test was conducted under the following conditions: a load of 1,335 N, a rotational frequency of 300 rpm, a temperature of 80° C., and a test period of 1 hour, and a pin used was AISIC1137 and a block used was SAE3135.

3. Capillary Clogging Test

Using a testing device shown in FIG. 1, a decreasing rate of a capillary flow volume after 1,000 hours was evaluated. The testing device 1, which is one disclosed in Japanese Patent Application Laid-Open No. 11-183334, includes: a compressor 2; a capillary tube 3 provided as means for reducing temperature and pressure; a high-temperature side channel 4 that allows a discharge orifice 2A of the compressor 2 to communicate with an inlet orifice 3A of the capillary tube 3; a low-temperature side channel 5 that allows an outlet orifice 3B of the capillary tube 3 to communicate with a suction inlet 2B of the compressor 2; and a heat exchanger 6 placed on the high-temperature side channel 4 and the low-temperature side channel 5 to carry out a heat exchange between refrigerants in the respective flow channels 4 and 5. On the high-temperature side channel 4, furthermore, a discharge-side pressure gauge 7 is provided between the compressor 2 and the heat exchanger 6. On the low-temperature side channel 5, a suction-side pressure gauge 8 is provided between the heat exchanger 6 and the compressor 2. On the downstream of the suction-side pressure gauge 8, a valve 9 for connecting with a vacuum pump is provided. Consequently, those structural components constitute a simulated circulation system 10 that allows the circulation of a refrigerant containing a refrigerator oil.

The test was conducted under the following conditions: a suction-side pressure (Ps) of 0.4 MPa; a discharge-side pressure (Pd) of 3.3 MPa; an inlet temperature of the heat exchanger (Td) of 110° C.; and an outlet temperature of the heat exchanger (Ts) of 30° C. In additions a refrigerant used was isobutane (R600a) and each amount of a sample oil (total amount of the components (A) and (B)) and the refrigerant in mixture was 400 g.

Examples 1 to 8 and Comparative Examples 1 to 7

The respective kinds of refrigerator oils composed of a base oil (A) and a specific compound (B) as shown in Table 1 were prepared and then evaluated by the evaluation method described above. The results are shown in Table 1.

Here, symbols that represent the respective components of (A) and (B) are as shown below.

A-1; polypropylene glycol dimethyl ether (viscosity at 40° C.; 46 mm²/s)

A-2; polyethylene glycol polypropylene glycol copolymer dimethyl ether (viscosity at 40° C.; 100 mm²/s)

A-3; ester of pentaerythritol and a mixture of 2-ethylhexanoic acid/3,5,5-trimethylhexanoic acid in a ratio of 1:1 (viscosity at 40° C.; 65 mm²/s)

A-4; poly-α-olefin (viscosity at 40° C.; 63 mm²/s)

A-5; alkylbenzene (viscosity at 40° C.; 38 mm²/s)

A-6; paraffinic mineral oil (viscosity at 40° C.; 90 mm²/s, sulfur content; 5 ppm by mass or less)

A-7; naphthenic mineral oil (viscosity at 40° C.; 10 mm²/S, sulfur content; 107 ppm by mass)

A-8; naphthenic mineral oil (viscosity at 40° C.; 56 mm²/s, sulfur content; 3,000 ppm by mass)

B-1; benzothiophene (sulfur content; 23.9% by mass)

B-2; dibenzothiophene (sulfur content; 17.4% by mass)

B-3; diphenylene disulfide (sulfur content; 29.6% by mass)

B-4; phenothiazine (sulfur content; 16.1% by mass)

B-5; diphenyl sulfide (sulfur content; 17.2% by mass)

B-6; dioctyldiphenyl sulfide (sulfur content; 7.8% by mass)

B-7; dioctyl polysulfide (sulfur content; 39% by mass)

B-8; tricresyl phosphate

TABLE 1

Table 1-1

| | | Examples | | | |
|---|---|---|---|---|---|
| | | 1 | 2 | 3 | 4 |
| Components (A) | A-1 | 99.88 | — | — | — |
| | A-2 | — | 99.83 | — | — |
| | A-3 | — | — | 99.9 | — |
| | A-4 | — | — | — | 99.82 |
| | A-5 | — | — | — | — |
| | A-6 | — | — | — | — |
| | A-7 | — | — | — | — |
| | A-8 | — | — | — | — |
| Components (B) | B-1 | 0.12 | — | — | — |
| | B-2 | — | 0.17 | — | — |
| | B-3 | — | — | 0.1 | — |
| | B-4 | — | — | — | 0.18 |
| | B-5 | — | — | — | — |
| | B-6 | — | — | — | — |
| | B-7 | — | — | — | — |
| | B-8 | — | — | — | — |
| | B-9 | — | — | — | — |
| Content of sulfur (% by mass) | | 0.03 | 0.03 | 0.03 | 0.03 |
| Sealed tube test | Oil appearance | Good | Good | Good | Good |
| | Copper appearance | Good | Good | Good | Good |
| | Presence or absence of sludge | Absence | Absence | Absence | Absence |
| Falex test (Wear loss: mg) | Refrigerant: $CO_2$ | 7 | 6 | 14 | 9 |
| | Refrigerant: propane | 9 | 7 | 16 | 9 |
| | Refrigerant: $NH_3$ | 14 | — | — | — |
| Capillary clogging test (decreasing rate of flow volume; %) | | 1 | 1 | 1 | 1 |

TABLE 2

Table 1-2

| | | Examples | | | |
|---|---|---|---|---|---|
| | | 5 | 6 | 7 | 8 |
| Components (A) | A-1 | — | — | — | 99.7 |
| | A-2 | — | — | — | — |
| | A-3 | — | — | — | — |
| | A-4 | — | — | — | — |
| | A-5 | 99.83 | — | — | — |
| | A-6 | — | 99.6 | — | — |
| | A-7 | — | — | 99.6 | — |
| | A-8 | — | — | — | — |
| Components (B) | B-1 | — | — | — | — |
| | B-2 | — | — | — | — |
| | B-3 | — | — | — | 0.3 |
| | B-4 | — | — | — | — |
| | B-5 | 0.17 | — | — | — |
| | B-6 | — | 0.4 | 0.4 | — |
| | B-7 | — | — | — | — |
| | B-8 | — | — | — | — |
| | B-9 | — | — | — | — |
| Content of sulfur (% by mass) | | 0.03 | 0.03 | 0.03 | 0.09 |
| Sealed tube test | Oil appearance | Good | Good | Good | Good |
| | Copper appearance | Good | Good | Good | Good |
| | Presence or absence of sludge | Absence | Absence | Absence | Absence |
| Falex test (Wear loss: mg) | Refrigerant: $CO_2$ | 7 | 8 | 5 | 13 |
| | Refrigerant: propane | 8 | 10 | 7 | 14 |
| | Refrigerant: $NH_3$ | — | — | — | — |
| Capillary clogging test (decreasing rate of flow volume; %) | | 1 | 1 | 1 | 1 |

TABLE 3

Table 1-3

| | | Comparative Examples | | | |
|---|---|---|---|---|---|
| | | 1 | 2 | 3 | 4 |
| Components (A) | A-1 | 99.98 | 99.4 | 99.98 | 99.5 |
| | A-2 | — | — | — | — |
| | A-3 | — | — | — | — |
| | A-4 | — | — | — | — |
| | A-5 | — | — | — | — |
| | A-6 | — | — | — | — |
| | A-7 | — | — | — | — |
| | A-8 | — | — | — | — |
| Components (B) | B-1 | 0.02 | 0.6 | — | — |
| | B-2 | — | — | — | — |
| | B-3 | — | — | 0.02 | 1 |
| | B-4 | — | — | — | — |
| | B-5 | — | — | — | — |
| | B-6 | — | — | — | — |
| | B-7 | — | — | — | — |
| | B-8 | — | — | — | — |
| | B-9 | — | — | — | — |
| Content of sulfur (% by mass) | | 0.005 | 0.14 | 0.006 | 0.3 |
| Sealed tube test | Oil appearance | Good | Pale yellow | Good | Pale yellow |
| | Copper appearance | Good | Discolored | Good | Discolored |
| | Presence or absence of sludge | Absence | Absence | Absence | Absence |
| Falex test (Wear loss: mg) | Refrigerant: $CO_2$ | Galling | 24 | Galling | 29 |
| | Refrigerant: propane | Galling | 38 | Galling | 42 |
| | Refrigerant: $NH_3$ | Galling | 45 | — | — |
| Capillary clogging test (decreasing rate of flow volume; %) | | — | 6 | — | 8 |

TABLE 4

Table 1-4

| | | Comparative Examples | | | |
|---|---|---|---|---|---|
| | | 5 | 6 | 7 | 8 |
| Components (A) | A-1 | — | 99.86 | 99.9 | 99 |
| | A-2 | — | — | — | — |
| | A-3 | — | — | — | — |
| | A-4 | — | — | — | — |
| | A-5 | — | — | — | — |
| | A-6 | — | — | — | — |
| | A-7 | — | — | — | — |
| | A-8 | 99.88 | — | — | — |
| Components (B) | B-1 | 0.12 | — | — | — |
| | B-2 | — | — | — | — |
| | B-3 | — | — | — | — |
| | B-4 | — | — | — | — |
| | B-5 | — | — | — | — |
| | B-6 | — | — | — | — |
| | B-7 | — | 0.14 | — | — |
| | B-8 | — | — | 0.1 | — |
| | B-9 | — | — | — | 1 |
| Content of sulfur (% by mass) | | 0.33 | 0.03 | 0.03 | — |
| Sealed tube test | Oil appearance | Yellow | Pale yellow | Yellow | Good |
| | Copper appearance | Discolored | Black | Black | Good |
| | Presence or absence of sludge | Presence | Absence | Presence | Absence |
| Falex test (Wear loss: mg) | Refrigerant: $CO_2$ | 17 | 18 | 31 | — |
| | Refrigerant: propane | 21 | 23 | 35 | 17 |
| | Refrigerant: $NH_3$ | — | — | — | — |
| Capillary clogging test (decreasing rate of flow volume; %) | | 5 | — | — | 7 |

INDUSTRIAL APPLICABILITY

The novel refrigerator oil composition of the present invention does not cause any environmental problems such as ozone layer destruction and global warming and retains its lubrication property for a long period of time, while preventing a capillary in a refrigeration cycle from clogging. Therefore, it can be suitably used in any of air conditioners, refrigerators, gas-heat pumps (GHPs), automatic vending machines, showcase refrigerators, car air conditioners, water heaters, floor heating appliances, and so on.

The invention claimed is:

1. A refrigerator oil composition, comprising:
   a base oil (A) composed of at least one selected from a polyalkylene glycol, a polyol ester, a poly-α-olefin, an alkyl benzene, and a mineral oil;
   at least one organic sulfur compound (B) selected from the group consisting of benzothiophene, dibenzothiophene, diphenylenedisulfide, phenothiazine, diphenylsulfide and dioctyldiphenylsulfide; and
   a refrigerant (C) composed of at least one selected from carbon dioxide gas, a hydrocarbon, and ammonia,
   wherein a total sulfur content is 0.01 to 0.1% by mass with respect to a total amount of the components (A) and (B).

2. The refrigerator oil composition according to claim 1, wherein the base oil (A) has a viscosity of 3 to 1,000 mm$^2$/s at 40° C. and a sulfur content of 200 ppm by mass or less.

3. The refrigerator oil composition according to claim 1, further comprising:
   an antioxidant;
   an acid scavenger; and
   a defoaming agent.

4. The refrigerator oil composition according to claim 1, further comprising no phosphorous extreme pressure agent.

5. The refrigerator oil composition of claim 1, wherein the organic sulfur compound is present in an amount of from 0.1-0.4% by mass.

6. The refrigerator oil composition according to claim 5, wherein the content of sulfur is from 0.03-0.09% by mass.

7. The refrigerator oil composition according to claim 6, wherein the refrigerant is at least one selected from the group consisting of carbon dioxide, propane and ammonia.

8. The refrigerator oil composition according to claim 6, wherein the refrigerant is at least one selected from the group consisting of propane and ammonia.

9. The refrigerator oil composition according to claim 6, wherein the refrigerant comprises propane and ammonia.

10. The refrigerator oil composition according to claim 6, wherein the base oil comprises at least one selected from the group consisting of polypropylene glycol dimethylether, polyethylene glycol polypropylene glycol copolymer, an ester of pentaerythritol, 2-ethyihexanoic acid, 3,5,5-trimethyihexanoic acid, a poly-α-olefin, an alkylbenzene, a paraffinic mineral oil and a naphthenic mineral oil.

* * * * *